(12) United States Patent
Vulgamott et al.

(10) Patent No.: US 8,240,073 B1
(45) Date of Patent: Aug. 14, 2012

(54) LABELING DEVICE

(75) Inventors: Rick Vulgamott, Brighton, MI (US);
Daniel T. Smith, Battle Creek, MI (US)

(73) Assignee: Multi Packaging Solutions, Inc., Lansing, MI (US)

( * ) Notice: Subject to any disclaimer, the term of this patent is extended or adjusted under 35 U.S.C. 154(b) by 0 days.

(21) Appl. No.: 13/155,705

(22) Filed: Jun. 8, 2011

(51) Int. Cl.
*G09F 3/08* (2006.01)
*A01G 9/02* (2006.01)

(52) U.S. Cl. ............... 40/645; D20/22; D20/26; 47/66.5

(58) Field of Classification Search ............ 40/645, 40/674; 47/66.5; 24/3.05 S
See application file for complete search history.

(56) References Cited

U.S. PATENT DOCUMENTS

| | | | |
|---|---|---|---|
| 334,981 A | 1/1886 | Rampe | |
| 1,430,641 A | 10/1922 | Ginn | |
| 1,446,841 A | 2/1923 | Dietsche | |
| 1,557,332 A * | 10/1925 | Robbins | 40/312 |
| 1,840,707 A | 1/1932 | Ensko | |
| 1,896,695 A | 2/1933 | Borovicka | |
| 1,949,903 A * | 3/1934 | Fales | 434/298 |
| 1,984,589 A | 12/1934 | Ludy | |
| 2,192,514 A | 3/1940 | Carleton | |
| 2,554,105 A | 4/1949 | Heinle | |
| 2,669,047 A * | 2/1954 | Rieger | 40/637 |
| 2,721,408 A | 10/1955 | Harris et al. | |
| 3,098,320 A | 7/1963 | Estkowski | |
| 3,621,809 A | 11/1971 | Paxton | |
| 3,775,882 A | 12/1973 | Wheeler | |
| D231,714 S | 5/1974 | Authur | |
| 3,946,507 A * | 3/1976 | Fergg et al. | 40/638 |
| D243,509 S | 3/1977 | Wheeler | |
| 4,027,410 A | 6/1977 | Wheeler | |
| D253,389 S | 11/1979 | South, Jr. | |
| 4,196,533 A | 4/1980 | Kamphausen | |
| D311,215 S | 10/1990 | Hickmott | |
| 4,972,616 A | 11/1990 | Doll | |
| D314,493 S | 2/1991 | Keane | |
| D393,660 S | 4/1998 | Gibson | |
| D398,639 S | 9/1998 | Merrick | |
| D402,863 S | 12/1998 | Hickmott | |
| D427,639 S | 7/2000 | Hickmott | |
| D428,445 S | 7/2000 | Hickmott | |
| D437,618 S | 2/2001 | Faulkner | |
| D443,310 S | 6/2001 | Faulkner | |
| 6,401,375 B1 | 6/2002 | Hickmott | |
| D520,065 S | 5/2006 | Doyle | |
| 7,073,282 B2 | 7/2006 | Savagian et al. | |
| 7,263,794 B2 | 9/2007 | Gilbertie | |
| D609,277 S | 2/2010 | Gibson et al. | |
| 2005/0223640 A1 * | 10/2005 | Hall et al. | 47/65.6 |
| 2009/0031597 A1 * | 2/2009 | Powell et al. | 40/310 |

FOREIGN PATENT DOCUMENTS

| | | | |
|---|---|---|---|
| GB | 2260308 A | | 4/1993 |
| JP | 2003131573 A | * | 5/2003 |
| JP | 2007104961 A | * | 4/2007 |

OTHER PUBLICATIONS

Co-pending U.S. Appl. No. 29/393,692, filed Jun. 8, 2011.

* cited by examiner

*Primary Examiner* — Casandra Davis
(74) *Attorney, Agent, or Firm* — Dobrusin & Thennisch PC

(57) ABSTRACT

A labeling device that can be attached to an article and subsequently modified by separating at least a portion of the device to be located within the article to provide information regarding the contents of an article.

20 Claims, 3 Drawing Sheets

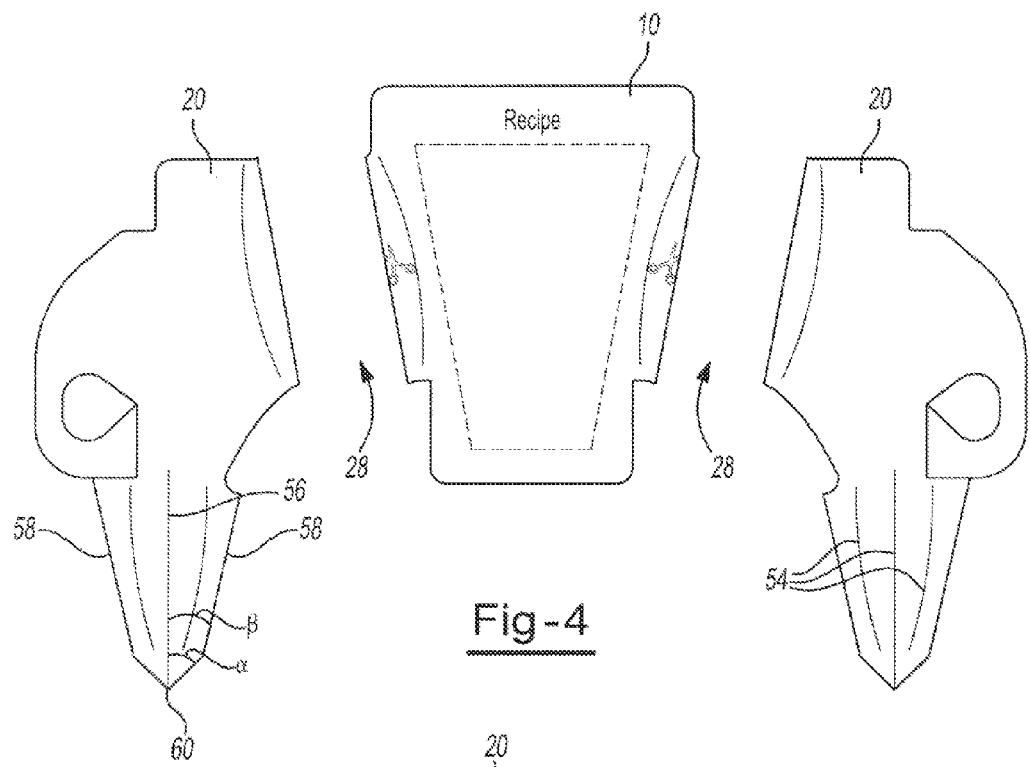
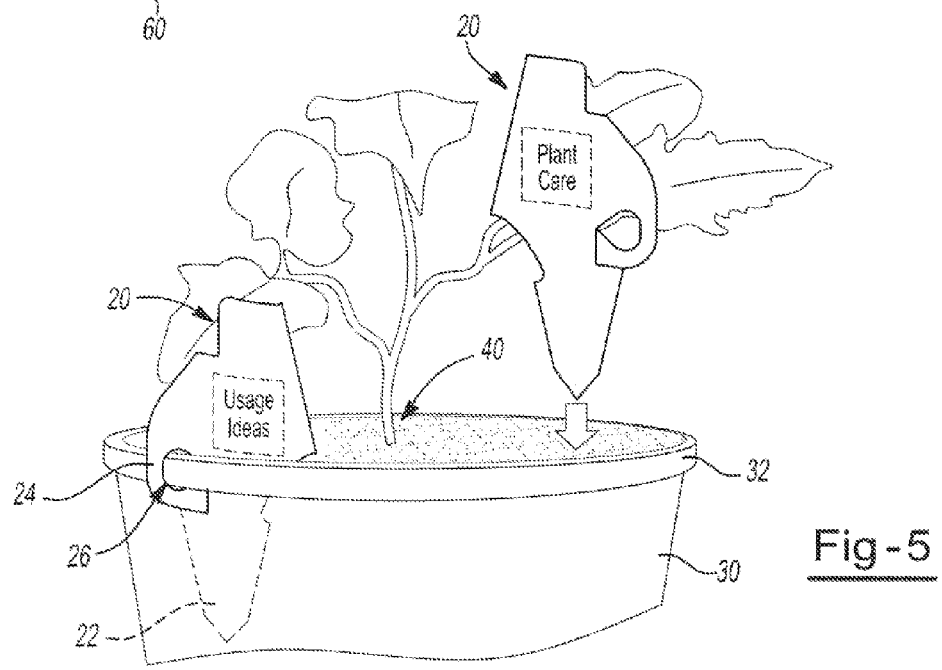

LABELING DEVICE

FIELD

The present teachings generally relate to an article labeling device and more specifically to a labeling device for plant containers.

BACKGROUND

Typical, labeling devices used for labeling containers and/or the contents of the container are connected to the outside of the container so that once the contents are removed from the container the label no longer serves to label the contents. Some labeling devices may be placed in the contents of the container; however, these are generally small in size and have a small labeling area. Other labeling devices that are placed in the contents of the container are large and the contents of the container are blocked from view, sunlight, or both. In addition these devices are generally constructed of one piece so that the labeling device only serves to label while the contents are in the container. Examples of such labeling devices are disclosed in U.S. Pat. Nos. D437,618; 1,840,707; 6,401,375; and 7,263,794; U.S. Patent Application Publication 2005/0223640; and U.K. Patent Application GB2260308 all of which are expressly incorporated herein by reference for all purposes. What is needed is a labeling device that includes a plurality of labeling areas. The plurality of labeling areas may be detachable so that the labeling areas may be used to label and/or provide information about the contents of the container once the contents have been removed from the container. What is also needed is a labeling device that may be used to label contents in multiple different locations simultaneously.

SUMMARY

The teachings herein surprisingly solve one or more of these problems by providing a multi-faceted labeling device that includes a plurality of labeling areas. These labeling areas may be attached to a container as one unitary piece or used as multiple discrete labeling areas that label separately. The labeling device may label one or more separate locations simultaneously. The labeling areas may contain the same or different information regarding the contents of the container, suggested uses of the contents of the container, or both. The labeling device taught herein provides a relatively large labeling area without preventing a potential purchaser and/or user from viewing the contents of the container, sunlight or air from reaching the contents of the container, or both.

One possible embodiment of the present teachings include: a labeling device comprising: a central portion, the central portion including: an upper region and a lower region; a removable portion on both sides of the central portion, the removable portions being removably attached to the central portion.

One unique aspect of the present teachings envisions a method of labeling comprising: obtaining the labeling device described herein; attaching the labeling device to a container; and pushing a portion of the removable portions into a content of the container.

BRIEF DESCRIPTION OF THE DRAWINGS

FIG. 4 illustrates the device after both of the removable portions have been removed; and FIG. 5 illustrates the removable portions being inserted into the contents of a container after the removable portions have been detached.

DETAILED DESCRIPTION

Figure 1:
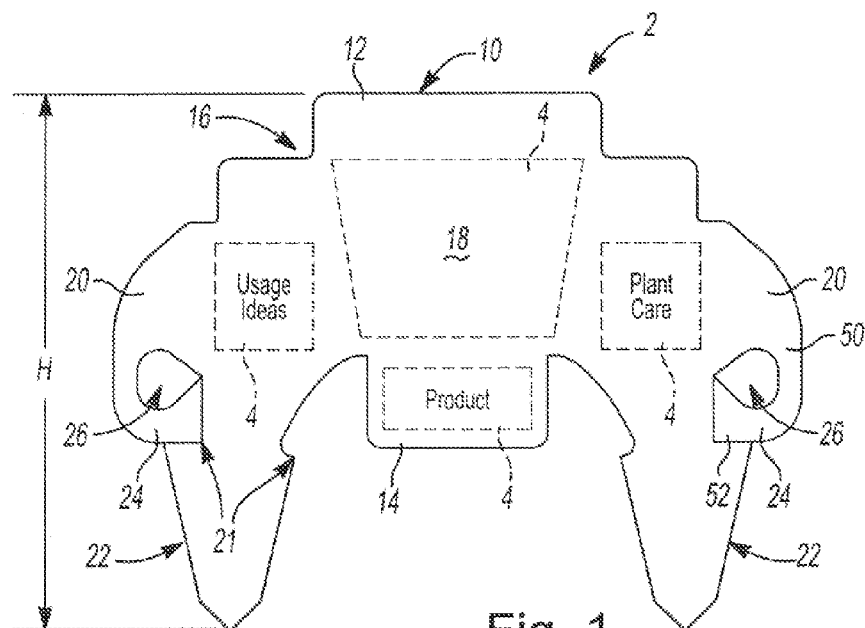
FIG. 1 illustrates a front elevational view of one embodiment of the teachings herein.

The following description of the preferred embodiment(s) is merely exemplary in nature and is in no way intended to limit the teachings, its application, or uses.

The present teachings are predicated upon providing a labeling device that is attached to an article that includes contents, preferably attached to and describing the contents of a container, and more preferably attached to a container that contains a plant and describes the plant, its uses, care instructions, recipes, or a combination thereof. The labeling device includes a central portion, the central portion being used for the primary description of the article and/or its contents. The central portion including: an upper region located above the article and including printed text and a lower region below an upper edge of and in front of the article and including a different printed text. The central portion including a removable portion on both sides of the central portion. The removable portions removably attaching the central portion to the article and being removable from the central portion. The removable portions including printed text and a tapered point so that the removable portions may be placed in and attached to the article after they are removed from the central portions.

The labeling device may be any device that may be used to label an article. The labeling device may be made of multiple pieces. Preferably, the labeling device may be made of one unitary piece. More preferably, the labeling device may be die cut or stamped from one unitary piece. The labeling device may be of any shape and size so that the device self-attaches to an article and provides labeling. The size and shape of the labeling device may vary based upon the size of the article in which the labeling device is labeling. For example, the labeling device may be about 14.5 cm (5.7 inches) long and about 11.5 cm (4.5 inches) wide when labeling a 15.2 cm (6 in) flower pot, and about 19.5 cm (7.7 inches) long and about 14 cm (5.5 inches) wide when labeling a 20 cm (8 in) flower pot. Preferably, the size and shape of the labeling device is any size and shape so that the labeling device does not interfere with sunlight reaching the contents of the article. The labeling device may have a length. The length may be the dimension of the labeling device that wraps fully or partially around the circumference or upper edge of the article. The labeling device may have multiple lengths. For example, the upper region may have one length, the lower region may have another length, and the central region (i.e. the area between the upper region and the lower region) may have yet a different length. Preferably, the central region may have the longest length. The longest length of the labeling device may be about 50 cm or less, about 40 cm or less, or about 30 cm or less. The longest dimension of the labeling device may be about 2 cm or more, about 5 cm or more, about 7 cm or more, or about 10 cm or more. The length of the labeling device may be based upon the size of the article to which the labeling device is to be attached. For example, the length of the labeling device for a pot having a diameter or side length of about 15 cm may be about 15 cm. The length of the labeling device may vary by about ±10 percent, about ±20 percent, or about ±50 percent of the circumference an/or perimeter of the article to which it is applied. The central portion may be longest length of the labeling device. The central portion may be shortest length of the labeling device. The removable portion may be the longest length of the labeling device. The removable portion may be the shortest length of the labeling device. The removable portion may be the longest length of the labeling device. The length of the labeling device may include both the central portion and the removable portions. The labeling device may include a height.

The height of the labeling device may be any height so that the labeling device may be used to label an article. The height of the labeling device may be any height so that a portion of the labeling device is below a top edge of an article and a portion of the labeling device is above the top edge of an article. The height of the labeling device may be low enough so that the labeling device does not interfere with sunlight reaching the contents of the article. The height of the labeling device may be measured from the lowest point of the central portion or the removable portion to the highest point of the central portion or the removable portion. The height of the labeling device in the largest dimension may be about 40 cm or less, about 30 cm or less, or about 20 cm or less. The height of the labeling device may be about 1 cm or more, about 5 cm or more, or about 10 cm or more (i.e. about 11.5 cm). As discussed herein, the height of the labeling device may vary according to the size of the article to which the labeling device is attached. The height of the labeling device may vary by about ±10 percent, about ±20 percent, or about ±50 percent of the dimensions discussed herein. The central portion may be the longest height of the labeling device. The central portion may be the shortest height of the labeling device. The removable portion may be the shortest height of the labeling device. Preferably, the central portion and the removable portion may each comprise a portion of the height, the length, or both of the labeling device. For example, the central portion may extend over the removable portion so the overall height may measure from the top of the central portion to the base of the removable portion.

The central portion may be any size and shape so that the removable portions may be attached on one or both sides of the central portion. The central portion may be any shape and size so that the central portion assists in holding the labeling device on an article. The central portion may be any size and shape so that advertising, product information, care instruction, pricing, pictures, stickers, recipes, any other printed media, or a combination thereof may be attached to, placed on, printed on, or a combination thereof the labeling device. The central portion may include one or more regions.

The central portion may include an upper region. The upper region may be any region that is stepped, tapered, gradually reduces in size, gradually increases in size, or a combination thereof so that sunlight is not substantially blocked from reaching the contents of the article. The upper region may be any size and shape discussed herein. The upper region may be any size and shape so that advertising, product information, care instruction, pricing, pictures, stickers, recipes, any other printed media, or a combination thereof may be attached or printed on the upper region. The upper region may be any region that extends above the article. Preferably, the entire upper region is located above the article. The upper region may assist in attaching the labeling device to the article. Preferably, the upper region does not assist in attaching the labeling device to the article. More preferably, the upper region is free of connection with the article. The upper region may be attached to a central region.

The central region may be any size and shape so that the labeling device may be used to label. The central region may be any size and shape discussed herein. The central region may be any area that contains a majority of the advertising, product information, care instruction, pricing, pictures, stickers, recipes, any other printed media, or a combination thereof. Preferably, the central region is attached to the removable portions, the upper region, the lower region, or a combination thereof. The central region may be partially located substantially above an upper edge of an article and partially located below the upper edge of an article. Preferably, the entire central region may be located above the upper edge of the article. The central region may be located between an upper region and a lower region.

The lower region may be any size and shape so that the lower region may be used to label. The lower region may be any size and shape discussed herein. The lower region may include advertising, product information, care instruction, pricing, pictures, stickers, recipes, any other printed media, or a combination thereof. The lower region may be located on the inside of the article. Preferably, the lower region is located on the outside of the article. The lower region may be located on the same side of the article as the removable portions. Preferably, the lower region is located on the opposite side of the article as the removable portions. The lower region may be free of attachment to an article. Preferably, the lower region may assist in connecting the labeling device to the article. The lower region may be free of connection with the removable portions. The lower region may be located adjacent to the removable portions.

The removable portions may be any portion that may be removed from the central portion. The removable portion may be permanently attached to the central portion and removed by any of the methods discussed herein. The removable portions may be opposite mirror images on opposite sides of the central portion. The removable portion may be removably attached to the central portion. The labeling device may include a detachment feature. Preferably, the detachment feature is located between the central portion and the two or more removable portions. The detachment feature may be slits, cuts, perforations, scores, creases, or a combination thereof between the removable portions and the central portions so that the removable portions may be removed from the central portions. The detachment feature may be located on the front side of the labeling device. The detachment feature may be located on both the front and back side of the labeling device. Preferably, the detachment features are located on the backside of the labeling device so that they are not visible on the front of the labeling device. The detachment features may assist in forming the labeling device so that the labeling device may be curved during use and placed in an article in a curved format. The detachment feature may allow the removable portion to be removed by folding, cutting, ripping, tearing, pulling, slicing, the like, or a combination thereof. The removable portions may include advertising, product information, care instruction, pricing, pictures, stickers, any other printed media, recipes, or a combination thereof.

The removable portions may be any shape and size so that the removable portions assist in labeling. The removable portions may be any size and shape so that the removable portions assist in attaching the labeling device to the article. The removable portions may be any shape and size so that at least a portion is located above an upper edge of an article and at least a portion is located below an upper edge of an article. The removable portion may be removed from the central portion and used to label individually. For example, each removable portion may include different product information and once removed from the central portion each may be placed near the contents of the container so that the contents may be labeled as discussed herein. The removable portion may be individually placed in the contents of the article so that they each function to label the contents of the article. The contents of the article may be removed from the article and planted at a second location so that the central portion may be located within the contents at the second location. The removable portions once removed may be used to perform any of the functions described herein to describe any the contents of the article discussed herein. The removable portion may include one or more features that assist in placing and holding the removable portion in the contents, on the article, or both. The removable portions may be collected so that the information on the removable portions may be used later. For example, the removable portion may include care instructions or a recipe and the user may remove the removable portion from the labeling device and store the removed portion until the plant matures so that the instructions or recipe may be used.

The removable portions may be tapered. The taper of the removable portion may be any configuration so that the tapered portion may be forced into one or more of the contents of the article so that the labeling device labels. The removable portions may gradually taper to form a point. The tapered portion may be "V-shaped," "U-shaped," spear shaped, diamond shaped, the like, or a combination thereof. An edge of the tapered portion may form an angle from the center line of the tapered portion (i.e. the center between the two edges of the tapered portion so that the edges have symmetry from the center line). The edge may form an angle of about 10 degrees or more, about 20 degrees or more, or about 30 degrees or more from the center line. The edge may form an angle of about 75 degrees or less, about 60 degrees or less, or about 45 degrees or less from the center line. The tapered portion may include multiple angles along the edge. For example the edge may start with a small angle and the angle may become larger as the edge gradually extends away from a tip. The tapered portion may include a second angle that may be any of the angles discussed herein. Preferably, the second angle is larger than the first angle.

The tapered portion may include one or more strengthening features. The strengthening features may be a score slit, fold, formable portion, the like, or a combination thereof so that the tapered portion may be contoured and strengthened.

The removable portions may include notches. The notches may be located anywhere along the length of the removable portion. The notches may be located above the tapered portion. Preferably, the notches may be located at the upper most region of the tapered portion. More preferably, the removable portion includes a notch on each side of the removable portion, and the notches are located above the tapered portion. The removable portion may include one or more features that assist in holding the removable portion, the labeling device, or both on or in the article. The notch may be located so that the removable portion, when still attached to the central portion, assists in connecting the labeling device to a cup, planter, pot, bucket, rim lip, handle, or a combination thereof.

The removable portions may include a holder. The holder may be any device that assists in holding the labeling device in communication with an article. During use of the label, the holder may be located substantially inside of the article. The holder may be located substantially outside of the article. Preferably, the holder may include a portion that is located on the inside of the article and a portion that is located on the outside of the article. The holder may be of any size and shape so that the holder assists in holding the labeling device in and/or on the article. The holder may be substantially "C-shaped"; "U-shaped"; "J-shaped"; or a combination thereof. The holder may have a portion that is free of material such that the holder may include an open space. The open space may be any shape so that the holder assists in holding the labeling device on the article. The open space may be round, oval, square, rectangular, diamond, star, or any other shape that assists in holding the labeling device on the article. Preferably, the open space is teardrop shaped. The holder may be integrally attached to the removable portion. The holder may have an attached side and an open side or detached side. The holder may have one attached side and one side may be free of attachment. The holder may have two attached sides. One of the attached sides may be removably attached so that once detached the holder may be placed around a portion of the article. The open or detached side may open so that a portion of the article may be placed in the open space of the labeling device and the open or detached side may be closed around the article so that the labeling device is secured to the article.

The article may be any item that holds contents. The article may retain water. The article may be bio-degradable. The article may be made of any material that holds contents and assists a user in carrying the contents. The article may be made of plastic, paper, cardboard, recycled material, virgin material, or a combination thereof. The article may include a lip. The article may include a rim. Preferably, the article includes an upper edge. The article may be any shape that holds contents. The article may be round, square, oval, rectangular, or a combination thereof. Preferably, the article may be any configuration so that the labeling device may be attached to at least a portion of the article. More preferably, the article may be configured so that at least a portion of the article fits into the open space in the labeling device. The article may be a pot, cup, bucket, pal, planter, the like, or a combination thereof. The article may be any item that assists a user in carrying contents.

The contents may be any item that fits into the article. The article preferably includes more than one content. At least one of the contents may be a malleable medium. At least one content may be potting soil, dirt, gravel, sand, fertilizer, or a combination thereof. One of the contents may be a living medium. The living medium may be a plant. For example, the living medium may be a herb, flower, tree, cactus, or a combination thereof. In one non-limiting example, the article may be a pot that includes dirt with herbs and the labeling device is at least partially pushed into the dirt and hooked around a lip of the pot and held in place. The contents may be removed from the article and placed and/or planted elsewhere.

The labeling device may be made of any material that allows the device to be used as a labeling device. The labeling device may be made of a flexible material. The labeling device may be made of a cuttable material. The labeling device may be made of a rippable material. The labeling device may be made of a material that may be slit, cut, perforated, scored, creased, or a combination thereof. The material may be made of any material that may be die cut. The labeling device may be made of a recyclable material. The labeling device may be made of a biodegradable material. The labeling device may be made of paper, plastic, metal, cardboard, coated paperboard, or a combination thereof. The labeling device may be made of any material that may be coated, painted, printed, adhered to, or a combination thereof. The labeling device may include a portion that may be written on so that notes may be written on the labeling device. The portion that may be written on may include a coating so that that the writing may be wiped off and more writing may be applied. For example, the user may include notes about the last time watered, fertilized, or both. The labeling device may include waterproofing. The labeling device may be washed and reused.

The labeling device may include one or more labeling areas. The labeling areas may be any area on the labeling device that may include a message from the manufacture, seller, end user, or a combination thereof to convey some message or information. The labeling area may be of any size and shape so that the labeling device may be used to label. The labeling area may be substantially the same size and any portion, region, or both of the labeling device. The labeling device may include labeling areas on the front and the back. Each part of the labeling device may include its own discrete labeling area. The labeling device may include only one labeling area. Preferably, the labeling device includes at least four labeling areas. However, the labeling device may include 5, 6, 7, or even 8 discrete labeling areas. The central portion may include one large labeling area on the front and back. However the central portion may include three discrete labeling areas on the front, back, or both. The upper region, central region, lower region, or a combination thereof may each include a discrete and/or different labeling area so that each labeling area may include different information. The removable portions may include labeling areas on the front, back, or both. The removable portions may preferably, at least include a labeling area on the front of one or more of the removable portions.

The device taught herein may be used in a process of labeling. The process may include one or more steps described herein and the steps may be performed in the order described herein or an order different than described herein. The process includes obtaining a labeling device described herein. Obtaining an article, a container, a plant, or a combination thereof to be labeled. Customizing the labeling device with a message, photo, instructions, information, usage ideas, plant care instruction, product information, any other information discussed herein, or a combination thereof. Printing on the labeling device. Attaching the label to the article. Detaching one or more of the removable portions from the central portion of the labeling device. Cutting one or more of the removable portions. Hooking a holder over an edge of an article. Placing a lower region over an edge of the article. Shaping the labeling device so that the labeling device conforms to the shape and/or contour of an article. Pressing one or more of the removable portions into the contents of the article. Pressing one of more of the removable portions to a region adjacent the contents of the article. Removing the contents from the article. Placing the labeling device or one or more of the removable portions adjacent the removed contents so that the contents are labeled. Collecting one or more of the removable portions so that usage ideas may be used at a later time and/or date.

FIG. 1 illustrates one example of the labeling device 2 taught herein. The labeling device 2 as shown includes four labeling areas 4. The labeling areas 4 as illustrated show usage ideas, plant care instructions, and a product description. The labeling device 2 further includes a central portion 10. The central portion 10 includes an upper region 12, a lower region 14, and a central region 18 between the upper region 12 and the lower region 14. The upper region 12 has a stepped portion 16. The central portion 10 is sandwiched between two removable portions 20. The removable portions 20 include a tapered region 22 with a notch 21 so that the removable portion 20 may be placed within the contents of an article (not shown). The removable portion further includes a holder 24 that has an attached side 50 and a detached side 52 with an open space 26 in the center of the holder 24. The labeling device includes a height (H).

Figure 2:
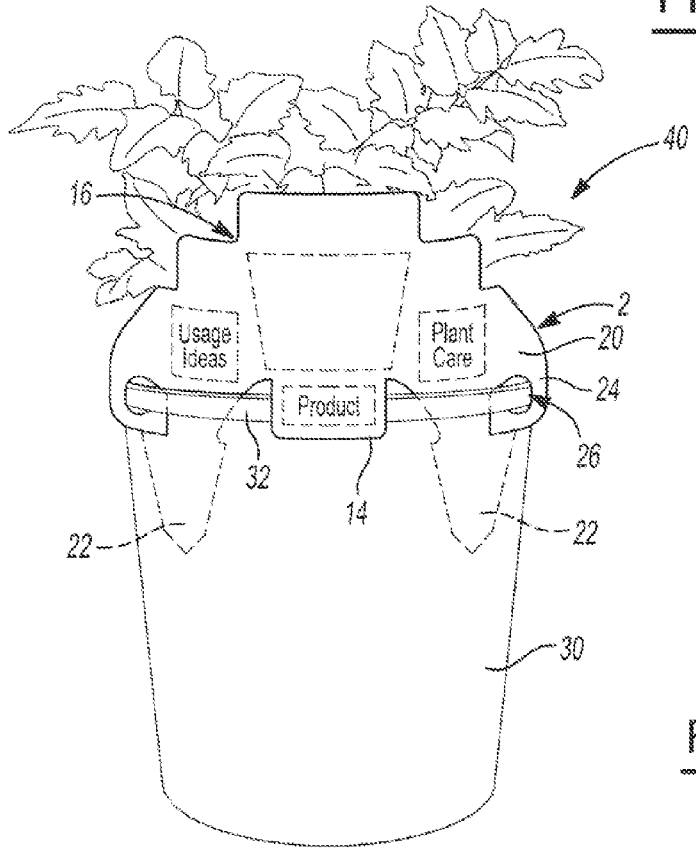
FIG. 2 illustrates the device of FIG. 1 labeling one possible article.

FIG. 2 illustrates the labeling device 2 used in conjunction with an article 30. The article 30 includes an edge 32 and the lower region 14 of the labeling device extends over the edge 32 of the article 30. The article 30 includes contents 40 and the tapered region 22 of the removable portion 20 is located at least a portion of the way in the contents 40. The holder 24 extends over the edge 32 of the article 30 so that the edge 32 is located in the open space 26 of the holder 24. The central portion 10 is stepped 16 so that the amount of sunlight reaching the contents 40 is maximized.

Figure 3:
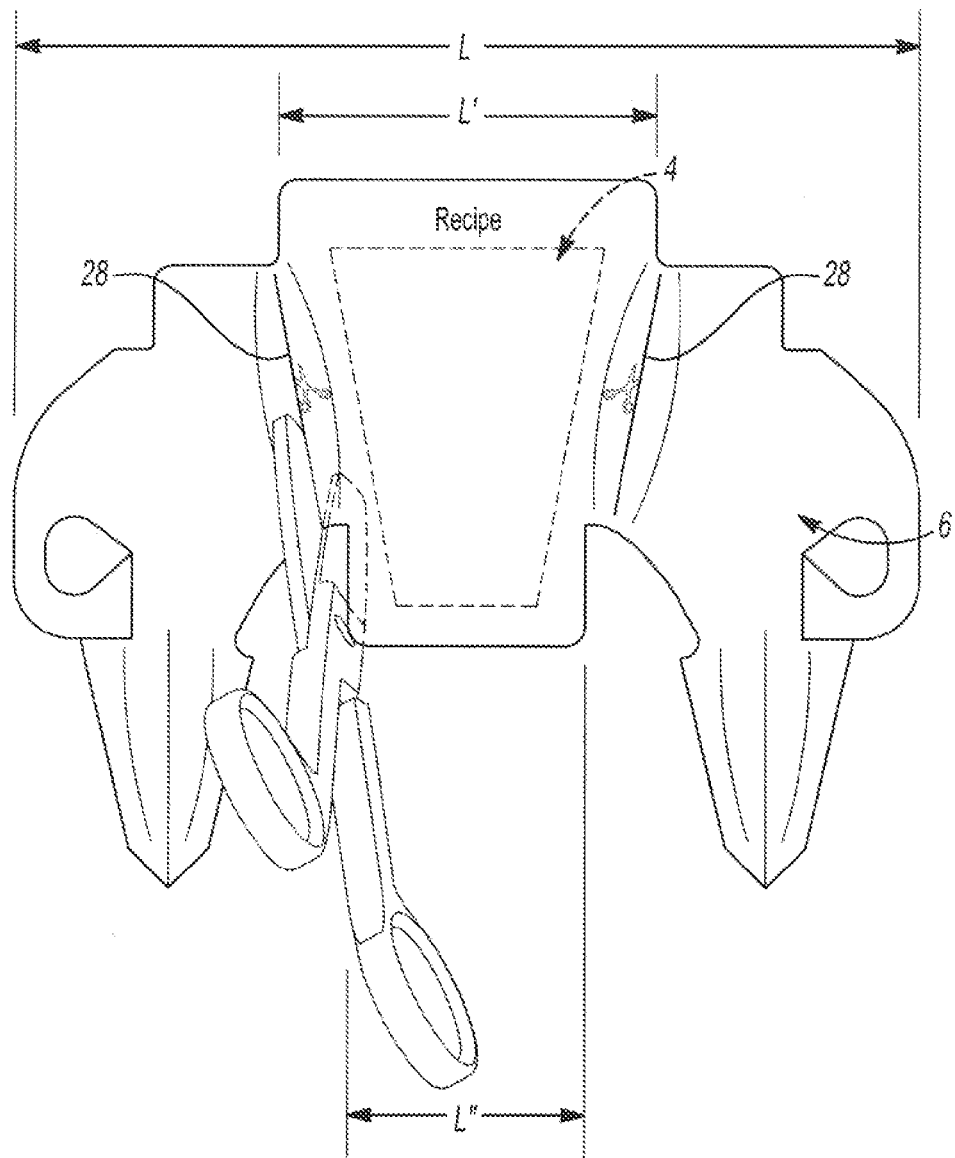
FIG. 3 illustrates one method for detaching a removable portion of the teachings herein.

FIG. 3 illustrates the back side 6 of the labeling device 2. The back side 6 includes detachment features 28 that assist in detaching the removable portions 20 from the central portion 10 and at least one additional labeling area 4. The labeling device includes an overall length (L), a length of the upper region (L'), and a length of the lower region (L").

FIG. 4 illustrates the central portion 10 and the removable portions 20 after the detachment features 28 have been employed to disconnect the removable portions 20. The tapered region 22 may include one or more strengthening portions 54. The tapered region 22 further includes at least two edges 58 that terminate at a point 60. The tapered region 22 has a centerline 56 disposed between the edges 58 and the edges each form a first angle (α) and a second angle (β) from the centerline.

FIG. 5 illustrates one removable portion 20 that has been attached to the edge 32 of the article 30 via the holder 24 being wrapped around the edge 32 so that the edge 32 fits into an open space 26, and the tapered region 22 has been placed into the contents 40 of the article. The second removable portion 20 is in the process of being pushed, as demonstrated by the arrow, into the contents 40 of the article so that the plant care instructions on the labeling area 4 are visible to the user.

Any numerical values recited herein include all values from the lower value to the upper value in increments of one unit provided that there is a separation of at least 2 units between any lower value and any higher value. As an example, if it is stated that the amount of a component or a value of a process variable such as, for example: temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A method of labeling comprising:
   a) obtaining a labeling device comprising:
      i) a central portion including:
         (1) an upper region and
         (2) a lower region;
      ii) a removable portion on both sides of the central portion, the removable portions being removably attached to the central portion;
   b) attaching the labeling device to an article;
   c) pushing a portion of one or both of the removable portions into a content of the article;
   d) detaching one or both of the removable portions;
   e) placing one or both of the detached removable portions in the contents of the article; and
   f) removing the contents of the article and placing one or more of the removable portions proximate to the removed contents.

2. The method of labeling of claim 1, wherein the removable portions further include a holder.

3. The labeling device of claim 2, wherein the holder is generally "C" shaped'.

4. The labeling device of claim 2, wherein the holder is integrally formed in the removable portion on one side and is free of attachment on the opposing side so that an article can be placed in the holder.

5. The method of labeling of claim 1, wherein the removable portions include a notch so that the removable portion when still attached to the central portion assists in connecting the labeling device to a pot, bucket, rim, lip, or a combination on thereof.

6. The labeling device of claim 5, wherein the notches are on a side of the removable portion closest to the central portion.

7. The labeling device of claim 5, wherein the notch is generally tear drop shaped.

8. The method of labeling of claim 1, wherein the removable portions include a notch on an opposite side of a holder.

9. The method of labeling of claim 1, wherein at least a portion of the removable portion extends into an article to which the labeling device is attached.

10. The method of labeling of claim 1, wherein the lower region of the central portion extends on the outside of any article to which the labeling device is attached.

11. The method of labeling of claim 1, wherein the removable portions are connected to the central portion via perforations.

12. The method of labeling of claim 1, wherein the labeling device is used with plants.

13. The method of labeling of claim 1, wherein the removable portion once removed maybe placed in the article so that product information is visible to a user.

14. The method of labeling of claim 1, wherein a size and shape of the upper region is any shape so that the upper region does not block sun light.

15. The method of labeling of claim 1, wherein the labeling device includes perforations or scores on the back side of the labeling device so that the labeling device conforms to an article that is generally circular or oval in shape.

16. The method of labeling of claim 1, wherein the central portion and the removable portions are made from one-piece of material.

17. The method of labeling of claim 1, wherein the labeling device includes a coating, printing, stickers, or a combination thereof.

18. The method of labeling of claim 1, wherein at least one end of the removable portions are tapered to a point.

19. The method of labeling of claim 1, wherein the labeling device may be used to label a potted plant a basket, a cup, a bucket, or a combination thereof.

20. The method of claim 1, wherein the: method includes the step of collecting one or more of the removable portions so that the usage ideas on the removable portion may be used.

* * * * *